(12) United States Patent
Lee et al.

(10) Patent No.: US 11,050,986 B2
(45) Date of Patent: Jun. 29, 2021

(54) DISPLAY DEVICE HAVING WHITE BALANCE ADJUSTING MODULE AND WHITE BALANCE ADJUSTING METHOD THEREOF

(71) Applicants: HKC CORPORATION LIMITED, Guangdong (CN); CHONGQING HKC OPTOELECTRONICS TECHNOLOGY CO., LTD., Chongqing (CN)

(72) Inventors: Chia-Hang Lee, Chongqing (CN); Jing-Ren Shi, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/639,488

(22) PCT Filed: Dec. 13, 2017

(86) PCT No.: PCT/CN2017/115903
§ 371 (c)(1),
(2) Date: Feb. 14, 2020

(87) PCT Pub. No.: WO2019/033638
PCT Pub. Date: Feb. 21, 2019

(65) Prior Publication Data
US 2021/0027727 A1   Jan. 28, 2021

(30) Foreign Application Priority Data
Aug. 16, 2017 (CN) .......................... 201710702561.X

(51) Int. Cl.
*H04N 9/31* (2006.01)
*H04N 9/73* (2006.01)
(Continued)

(52) U.S. Cl.
CPC ............. *H04N 9/73* (2013.01); *G09G 3/3607* (2013.01); *G09G 5/06* (2013.01); *H04N 9/3182* (2013.01);
(Continued)

(58) Field of Classification Search
CPC .......... G09G 3/3607; H04N 1/60; H04N 9/73; H04N 9/3182
See application file for complete search history.

(56) References Cited

U.S. PATENT DOCUMENTS

| | | | |
|---|---|---|---|
| 9,437,163 B2 | 9/2016 | Marcu | |
| 2012/0188265 A1* | 7/2012 | Suzuki | G09G 5/06 345/589 |

(Continued)

FOREIGN PATENT DOCUMENTS

| | | |
|---|---|---|
| CN | 102509541 A | 6/2012 |
| CN | 104049401 A | 9/2014 |

(Continued)

*Primary Examiner* — Roy P Rabindranath
(74) *Attorney, Agent, or Firm* — Muncy, Geissler, Olds and Lowe, P.C.

(57) ABSTRACT

A display device and a white balance adjusting method thereof are provided. The white balance adjusting method comprises: measuring a stimulus value of each of gray scales of each of pixels of a panel; defining a white point voltage and a white chromaticity; calculating a white chromaticity difference between a bright state white point voltage and a dark state white point voltage; defining a target white balance curve according to the white point voltage, the white chromaticity and the white chromaticity difference; and obtaining a white balance look-up table according to the (Continued)

white balance curve to complete a white balance adjustment of the display device.

19 Claims, 5 Drawing Sheets

(51) Int. Cl.
  *G09G 3/36* (2006.01)
  *G09G 5/06* (2006.01)
(52) U.S. Cl.
  CPC ............... *G09G 2300/0452* (2013.01); *G09G 2320/0242* (2013.01); *G09G 2320/0666* (2013.01); *G09G 2320/0673* (2013.01)

(56) References Cited

U.S. PATENT DOCUMENTS

| | | | |
|---|---|---|---|
| 2012/0206478 A1* | 8/2012 | Nakamura | G09G 5/06 345/589 |
| 2013/0201224 A1* | 8/2013 | Kang | G09G 5/02 345/690 |
| 2017/0064227 A1 | 3/2017 | Lin et al. | |
| 2018/0240415 A1* | 8/2018 | Chen | H04N 9/73 |

FOREIGN PATENT DOCUMENTS

| | | |
|---|---|---|
| CN | 105282531 A | 1/2016 |
| CN | 106469538 A | 3/2017 |
| CN | 106773268 A | 5/2017 |
| JP | 2013135369 A | 7/2013 |

\* cited by examiner

DISPLAY DEVICE HAVING WHITE BALANCE ADJUSTING MODULE AND WHITE BALANCE ADJUSTING METHOD THEREOF

BACKGROUND

Technical Field

This disclosure relates to a technical field of a display, and more particularly to a display device and a white balance adjusting method thereof.

Related Art

With the development and progress of the technology, the liquid crystal display having the thin body, the power-saving and low-radiation features has become the mainstream product of the display, and various displays are widely applied to various aspects of life. The white balance property of the display is an important indicator of the color quality of the display. In general, the liquid crystal display needs the white balance adjustment to keep the white chromaticity of each of the gray scales at the constant level; or otherwise the color representation of the display is distorted.

According to the driving principle of the liquid crystal display, the white chromaticity of the display relates to the drive voltages of the corresponding red, green and blue pixels. For the white frame, the red, green and blue pixels are driven by the same voltage. However, regarding the opto-electronic property of the liquid crystal under different voltages, different rotating angles of the liquid crystal molecules cause different opto-electronic effects. Thus, under different driving voltages, the caused white chromaticity is drifted. More particularly, in the design of the vertical alignment (VA) type liquid crystal display, the chromaticity difference between the white bright state and the dark state is extremely large. How to appropriately adjust the red, green and blue voltages corresponding to each gray scale of the white to calibrate the white chromaticity is a very important work for the display. Thus, how to improve the white balance adjusting method to prevent the poor frame color shift and improve the picture quality has become a problem to be solved by those skilled in the art.

The background includes information that may be useful in understanding the present disclosure. It is not an admission that any of the information provided herein is prior art or relevant to the presently claimed disclosure.

SUMMARY

In view of the above-mentioned drawbacks of the existing art, the technical problem to be solved by this disclosure is to provide a display device and a white balance adjusting method thereof to obtain the better coordination continuity of the display at the lower gray scale, and the better white balance effect.

To achieve the above objective, the disclosure provides a white balance adjusting method of a display device, comprising: measuring a stimulus value of each of gray scales of each of pixels of a panel; defining a white point voltage and a white chromaticity; calculating a white chromaticity difference between a bright state white point voltage and a dark state white point voltage; defining a target white balance curve according to the white point voltage, the white chromaticity and the white chromaticity difference; and obtaining a white balance look-up table according to the white balance curve to complete a white balance adjustment of the display device.

Furthermore, the pixels comprise a red pixel, a green pixel and a blue pixel. In this specific embodiment, before the white point voltage and the white chromaticity are defined, the three-coordinate-system stimulus values of the red pixel, the green pixel and the blue pixel of the panel corresponding to each gray scale in the standard chromaticity system are measured.

Furthermore, the method further includes a step of calculating the stimulus value to 10 to 12 bits by way of interpolation before the step of defining the white point voltage and the white chromaticity.

Furthermore, the white point voltage is the highest voltage corresponding to the highest value of the transmission rate of the display device. The white chromaticity is the red-pixel white chromaticity point, the green-pixel white chromaticity point and the blue-pixel white chromaticity point corresponding to the display device at the highest voltage. In this embodiment, at least the white point voltage, the white chromaticity and the white chromaticity difference need to be used to define the white balance curve. The white chromaticity represents the red-pixel white chromaticity point, the green-pixel white chromaticity point and the blue-pixel white chromaticity point corresponding to the display device at the highest voltage. The above-mentioned white chromaticity point obtained by way of calculating is advantageous to the subsequent calculations of the white point voltage, the white chromaticity and the white chromaticity difference.

Furthermore, the step of defining the target white balance curve according to the white point voltage, the white chromaticity and the white chromaticity difference includes: defining a target white balance curve after setting a chromaticity coordinate turning point according to the white point voltage, the white chromaticity and the white chromaticity difference. In this embodiment, the target white balance curve is calculated according to the white point voltage, the white chromaticity and the white chromaticity difference. Thus, the chromaticity coordinate turning point will be set to describe the more suitable target white balance curve upon depicting. Specifically, the adjustment of the chromaticity coordinate turning point is the dynamic adjustment process. When the white chromaticity difference is smaller, the chromaticity coordinate turning point can be reduced to enhance the white balance effect of the display device. When the white chromaticity difference is too large, the chromaticity coordinate turning point is increased to prevent the problem of the too high brightness and chromaticity error. Thus, the depicting requirements of the chromaticity and brightness of the white balance can be better satisfied. In addition, when the white balance of the display device is being adjusted, the white balance curve starts to turn to the dark state white chromaticity at the location, where the gray scale of the bright state white chromaticity error reaches the minimum, according to the chromaticity minimum error method, and the point is the chromaticity coordinate turning point.

Furthermore, the method further includes, after the step of defining the target white balance curve according to the white point voltage, the white chromaticity and the white chromaticity difference, the step of: using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2. In this embodiment, the white balance adjustment of the panel is performed by considering the problems of the dark state white chromaticity and the bright state white chromaticity. In order to solve this problem, the white point voltage, the white chromaticity, the white chromaticity difference and the associated data are calculated. Then, the white balance pixel look-up table obtained using the root-mean-square minimum error method can solve the problem of the poor coordination continuity at the lower gray scale. Meanwhile, the chromaticity error problem is solved.

Furthermore, keeping the white chromaticity gamma value to be equal to 2.2 must satisfies the following formulas:

$$Y(R-LUT)+Y(G-LUT)+Y(B-LUT)=\text{gamma}2.2 \qquad 1); \text{ and}$$

$$\text{Min}((Wx-\text{Wxtar})^2+(Wy-\text{Wytar})^2) \qquad 2);$$

where Y represents the Y coordinate system of the standard white chromaticity system, R represents the gray scale value of the red pixel at different gray scale voltages, G represents the gray scale value of the green pixel at different gray scale voltages, B represents the gray scale value of the blue pixel at different gray scale voltages, and LUT represents the gray scale value corresponding to each color at different gray scale voltages before adjustment; Wx represents the coordinate value of the white chromaticity X coordinate system, Wy represents the coordinate value of the white brightness Y coordinate system, Wxtar represents the coordinate value of the target white chromaticity X coordinate system, and Wytar represents the coordinate value of the target white chromaticity Y coordinate system. In this embodiment, the formula calculations of the optimum restricting condition based on the target white balance curve are performed to obtain the white balance look-up table satisfying the requirement of this disclosure, and to solve the problems that the low gray scale white chromaticity cannot be maintained, and the chromaticity error is increased.

Furthermore, the pixels comprise a red pixel, a green pixel and a blue pixel. The method further includes a step of calculating the stimulus value to 10 to 12 bits by way of interpolation before the step of defining the white point voltage and the white chromaticity. The white point voltage is the highest voltage corresponding to the highest value of the transmission rate of the display device. The white chromaticity is the red-pixel white chromaticity point, the green-pixel white chromaticity point and the blue-pixel white chromaticity point corresponding to the display device at the highest voltage.

Furthermore, the pixels comprise a red pixel, a green pixel and a blue pixel. The step of defining the target white balance curve according to the white point voltage, the white chromaticity and the white chromaticity difference includes: defining a target white balance curve after setting a chromaticity coordinate turning point according to the white point voltage, the white chromaticity and the white chromaticity difference;

The method further includes, after the step of defining the target white balance curve according to the white point voltage, the white chromaticity and the white chromaticity difference, the step of: using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2; and Keeping the white chromaticity gamma value to be equal to 2.2 must satisfies the following formulas:

$$Y(R-LUT)+Y(G-LUT)+Y(B-LUT)=\text{gamma}2.2 \qquad 1); \text{ and}$$

$$\text{Min}((Wx-\text{Wxtar})^2+(Wy-\text{Wytar})^2) \qquad 2);$$

where Y represents the Y coordinate system of the standard white chromaticity system, R represents the gray scale value of the red pixel at different gray scale voltages, G represents the gray scale value of the green pixel at different gray scale voltages, B represents the gray scale value of the blue pixel at different gray scale voltages, and LUT represents the gray scale value corresponding to each color at different gray scale voltages before adjustment; Wx represents the coordinate value of the white chromaticity X coordinate system, Wy represents the coordinate value of the white brightness Y coordinate system, Wxtar represents the coordinate value of the target white chromaticity X coordinate system, and Wytar represents the coordinate value of the target white chromaticity Y coordinate system. In this embodiment, the formula calculations of the optimum restricting condition based on the target white balance curve are performed to obtain the white balance look-up table satisfying the requirement of this disclosure, and to solve the problems that the low gray scale white chromaticity cannot be maintained, and the chromaticity error is increased.

The disclosure also provides a white balance adjusting method of a display device, comprising: measuring a stimulus value of each of gray scales of each of pixels of a panel, wherein the pixels comprise a red pixel, a green pixel and a blue pixel; calculating the stimulus value to 10 to 12 bits by way of interpolation; defining a white point voltage and a white chromaticity; calculating a white chromaticity difference between a bright state white point voltage and a dark state white point voltage; defining the target white balance curve after setting a chromaticity coordinate turning point according to the white point voltage, the white chromaticity and the white chromaticity difference; using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2; and completing a white balance adjustment of the display device according to the adjusted second white balance pixel look-up table.

The disclosure further provides a display device comprising a white balance adjusting module. The white balance adjusting module comprises: a stimulus value measuring unit measuring a stimulus value of each of gray scales of each of pixels of a panel; a white point voltage calculating unit defining a white point voltage and a white chromaticity, and calculating a white chromaticity difference between a bright state white point voltage and a dark state white point voltage; and a white balance adjusting unit defining a target white balance curve according to the white point voltage, the white chromaticity and the white chromaticity difference and obtaining a white balance look-up table according to a white balance curve to complete a white balance adjustment of the display device. In the white balance adjusting method of the display device of this disclosure, not only the minimum error calculation is considered and performed according to the high gray scale white chromaticity and the coordinate system, but also the dark state white chromaticity, which is caused by the rotating angle and the material property of the liquid crystal and cannot be adjusted to be consistent with the bright state white chromaticity, is considered, so that the white chromaticity present in a gray scale changing zone cannot be maintained when approaching the dark gray scale, and the problem of the increased chromaticity error is present. Specifically, measuring each of the gray scales of each of the pixels of the panel to define the white point voltage and the white chromaticity, calculating the white chromaticity difference between the bright state white point voltage and the dark state white point voltage, and defining the target white balance curve according to the white point voltage, the white chromaticity and the white chromaticity difference can obtain the adjusted white balance look-up table for completing the white balance adjustment of the display device. The coordination property of the white balance of the liquid crystal display can be effectively enhanced, the performance representation including the color becomes better, and the picture quality requirements of the optimum chromaticity and brightness are satisfied. More particularly, the coordination continuity at the lower gray scale is better, so that the white balance effect of the display device becomes better.

In order to make this disclosure be understood, more comprehensive descriptions of this disclosure will be made in the following with reference to the associated drawings. Preferred embodiments of this disclosure are given in the drawings. However, this disclosure may be implemented in various forms, and is not restricted to the embodiments disclosed herein. On the contrary, the purpose of providing these embodiments is to make the contents of this disclosure be understood more comprehensively.

The features described and/or illustrated for one embodiment may be used in one or more other embodiments in the same or similar manner, may be combined with the features in other embodiments, or may be used to replace the features in other embodiments.

It should be emphasized that the term "including/comprising" as used herein represents the presence of a feature, whole piece, step or element, but does not exclude the presence or addition of one or more other features, whole pieces, steps or elements.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

Figure 1:
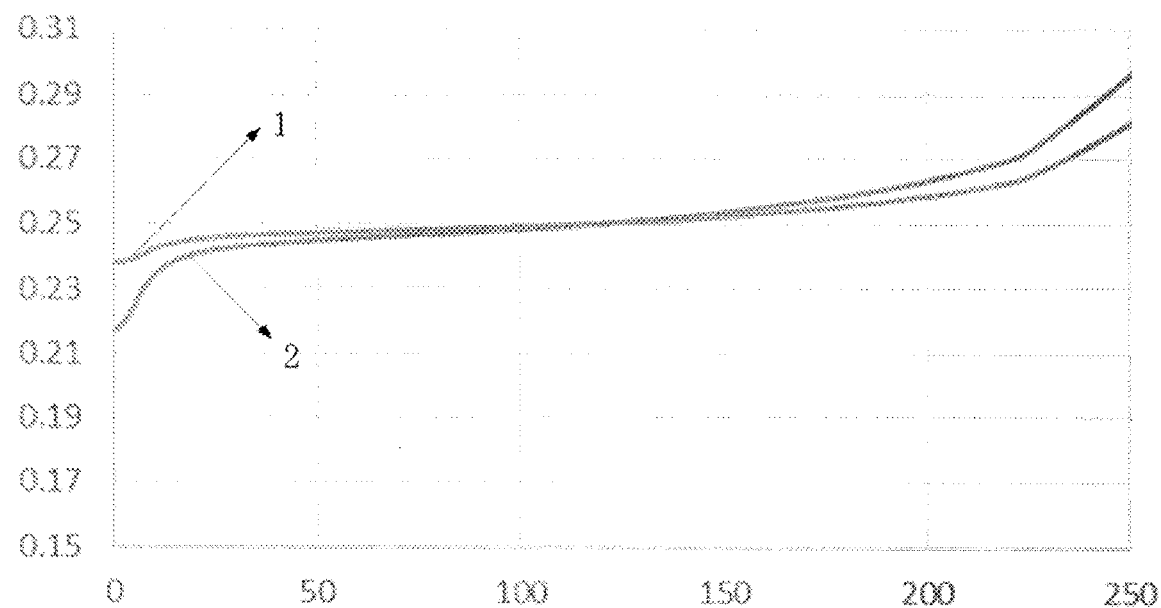
FIG. 1 is a schematic view showing a white balance chromaticity curve before the original white balance adjustment in this disclosure.
Figure 2:
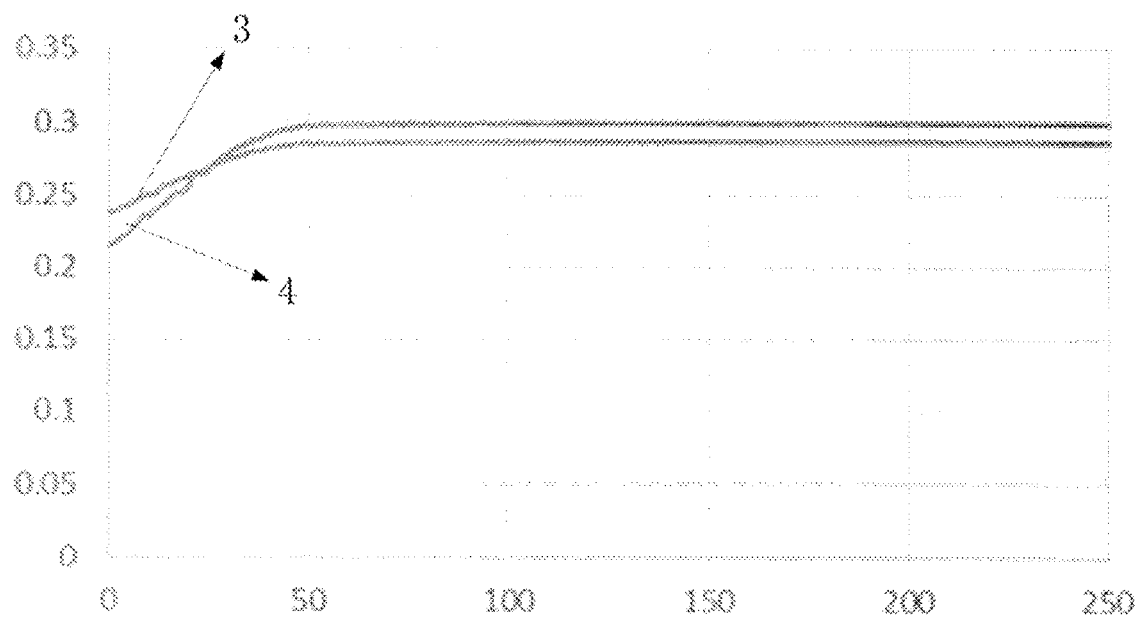
FIG. 2 is a schematic view showing the white balance chromaticity curve after the original white balance adjustment in this disclosure.

FIG. 1 is a schematic view showing a white balance chromaticity curve before the original white balance adjustment in this disclosure. FIG. 2 is a schematic view showing an adjusted white balance chromaticity curve of the original white balance. In FIGS. 1 and 2, symbol 1 represents a white balance first curve before the white balance adjustment, symbol 2 represents a white balance second curve before the white balance adjustment, symbol 3 represents the white balance first curve after the white balance adjustment, and symbol 4 represents the white balance second curve after the white balance adjustment.

The white balance property of the display is an important indicator of the color quality of the display. In general, the liquid crystal display needs the white balance adjustment to keep the white chromaticity of each of the gray scales at the constant level; or otherwise the color representation of the display is distorted. Referring FIGS. 1 and 2, the color representation after the white balance adjustment is better than that before the white balance adjustment, but the adjusting method still has the problem that the transmission rate of the panel is not high enough.

Thus, this disclosure discloses the following improvement solutions.

Figure 3:
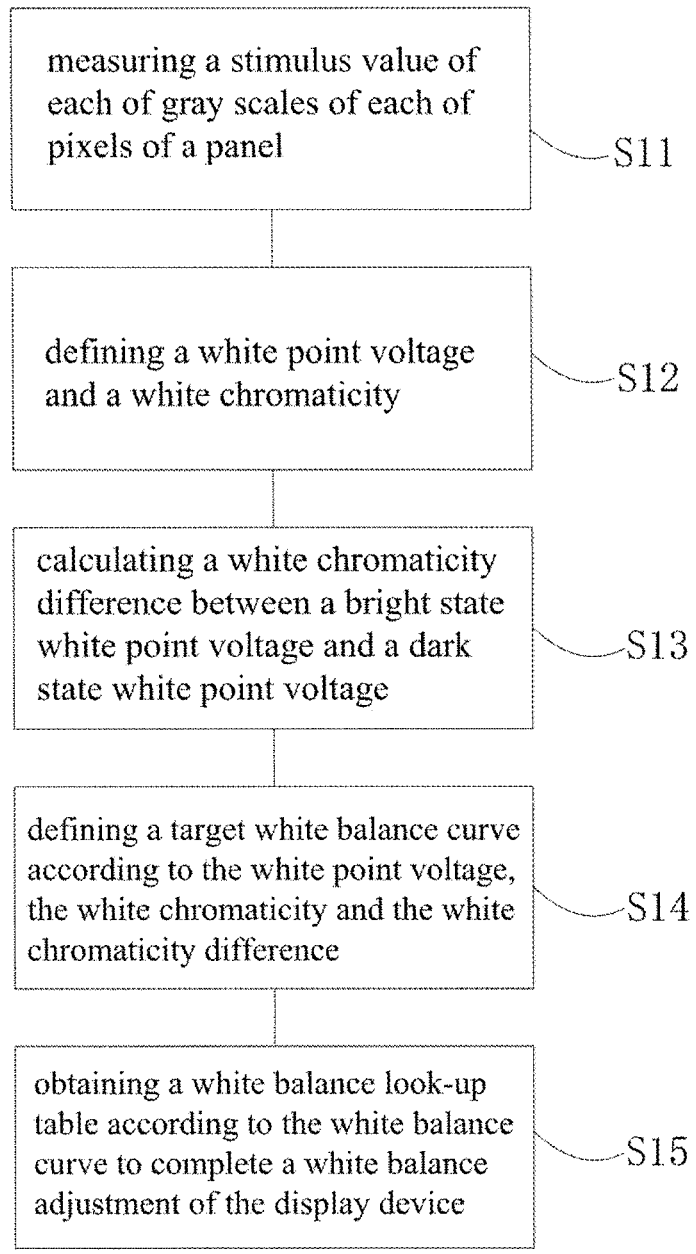
FIG. 3 is a flow chart showing a white balance adjusting method of this disclosure.
Figure 4:
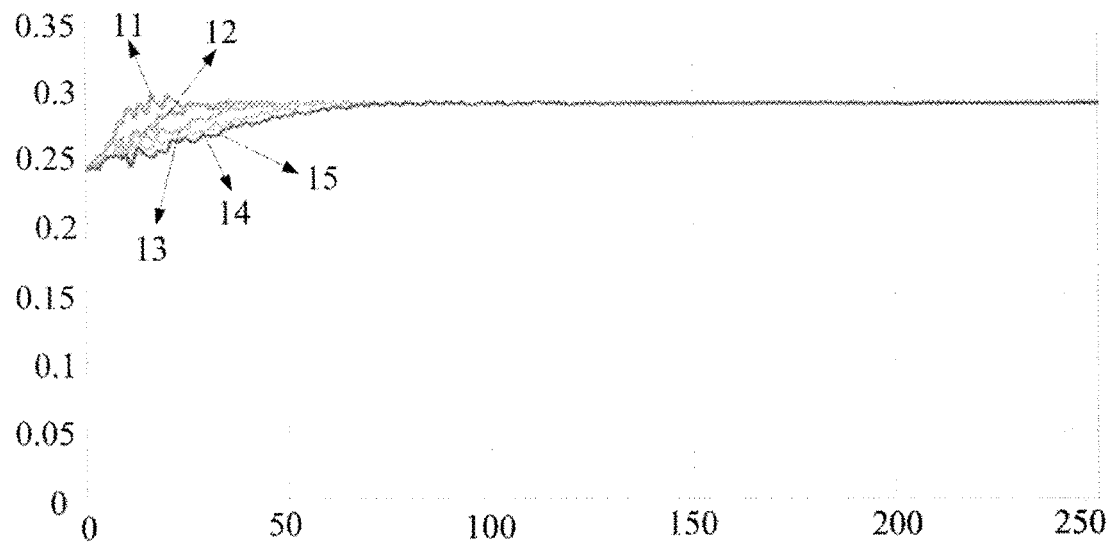
FIG. 4 is a schematic view showing the white chromaticity of the white balance first curve in this disclosure.
Figure 5:
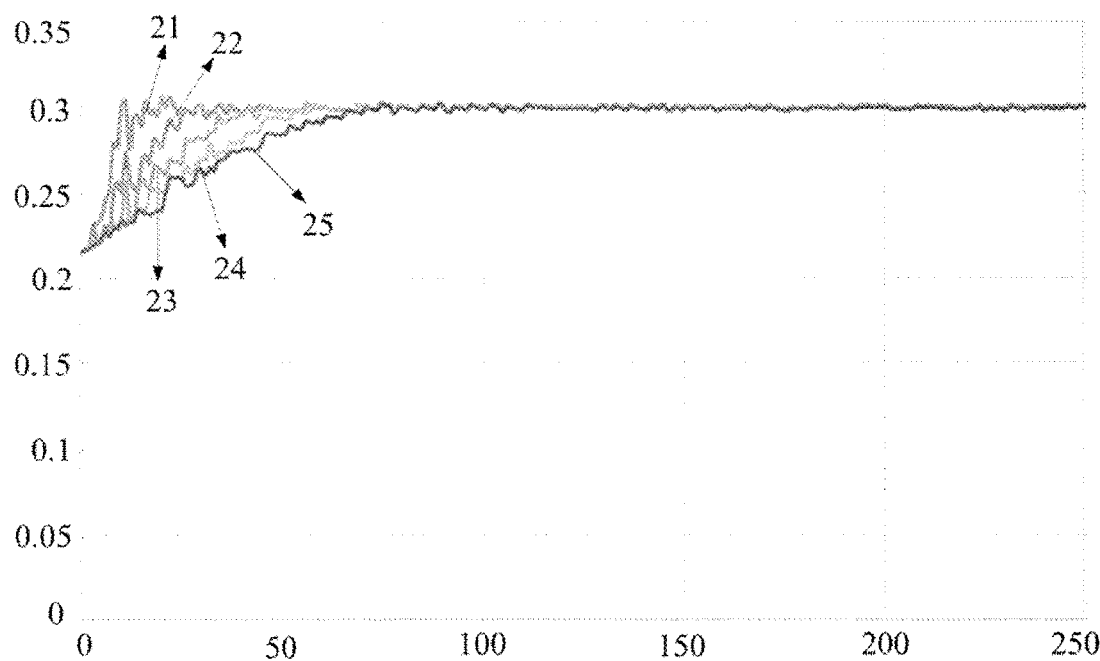
FIG. 5 is a schematic view showing the white chromaticity of the white balance second curve in this disclosure.
Figure 6:
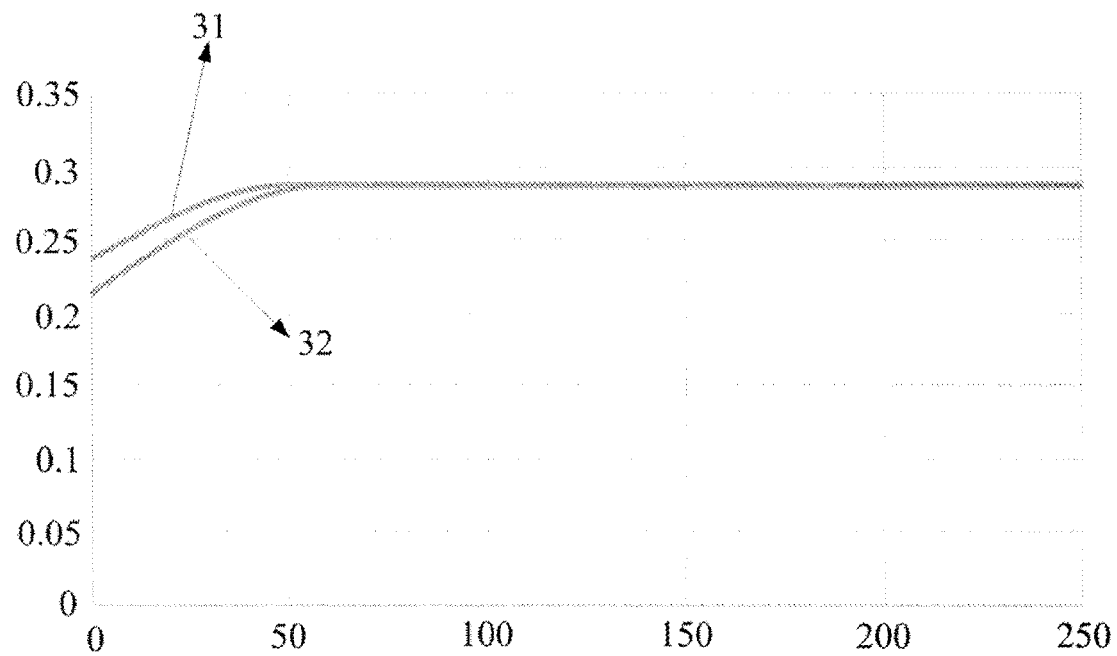
FIG. 6 is a target white balance graph showing the white balance first curve of this disclosure.
Figure 7:
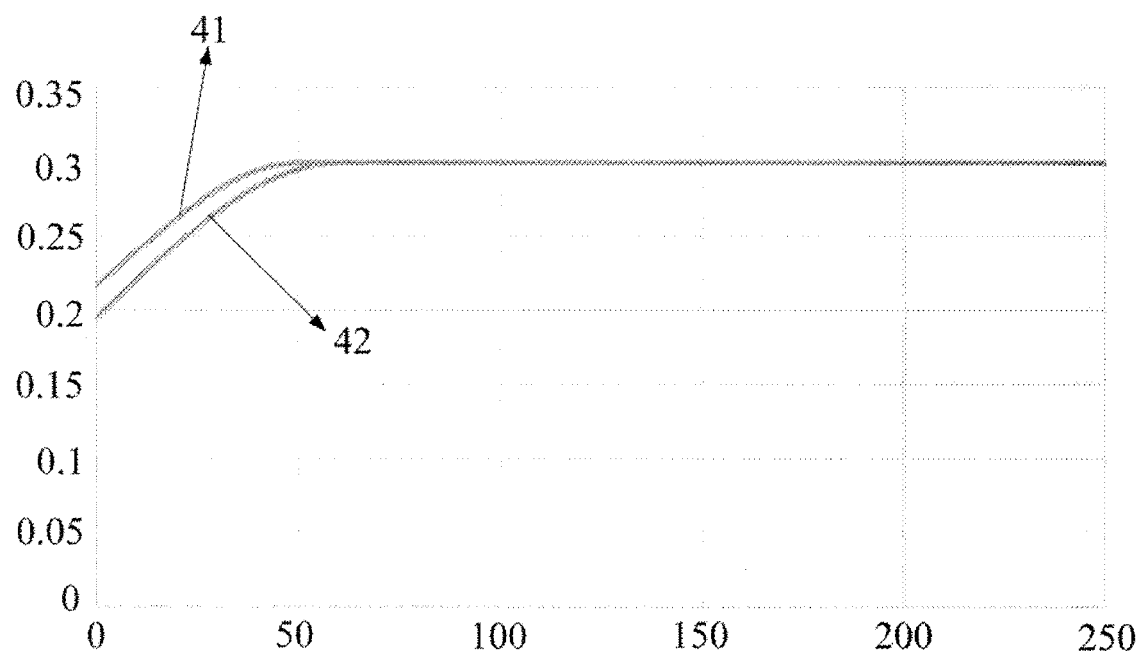
FIG. 7 is a target white balance graph showing the white balance second curve of this disclosure.

FIG. 3 is a flow chart showing a white balance adjusting method of this disclosure. FIG. 4 is a schematic view showing the white chromaticity of the white balance first curve in this disclosure. FIG. 5 is a schematic view showing the white chromaticity of the white balance second curve in this disclosure. FIG. 6 is a target white balance graph showing the white balance first curve of this disclosure. FIG. 7 is a target white balance graph showing the white balance second curve of this disclosure. Symbol 11 represents the white chromaticity curve when the coordinate turning point of the white balance first curve is 16, symbol 12 represents the white chromaticity curve when the coordinate turning point of the white balance first curve is 32, symbol 13 represents the white chromaticity curve when the coordinate turning point of the white balance first curve is 48, symbol 14 represents the white chromaticity curve when the coordinate turning point of the white balance first curve is 64, symbol 15 represents the white chromaticity curve when the coordinate turning point of the white balance first curve is 80; symbol 21 represents the white chromaticity curve when the coordinate turning point of the white balance second curve is 16, symbol 22 represents the white chromaticity curve when the coordinate turning point of the white balance second curve is 32, symbol 23 represents the white chromaticity curve when the coordinate turning point of the white balance second curve is 48, symbol 24 represents the white chromaticity curve when the coordinate turning point of the white balance second curve is 64, symbol 25 represents the white chromaticity curve when the coordinate turning point of the white balance second curve is 80; and symbol 31 represents the target curve of the first coordinate turning point of the white balance first curve, symbol 32 represents the target curve of the second coordinate turning point of the white balance first curve, symbol 41 represents the target curve of the first coordinate turning point of the white balance second curve, and symbol 42 represents the target curve of the second coordinate turning point of the white balance second curve.

Referring to FIGS. 3 to 7, this disclosure provides a white balance adjusting method of a display device, which includes:

a step S11 of measuring a stimulus value of each of gray scales of each of pixels of a panel;

a step S12 of defining a white point voltage and a white chromaticity;

a step S13 of calculating a white chromaticity difference between a bright state white point voltage and a dark state white point voltage;

a step S14 of defining a target white balance curve according to the white point voltage, the white chromaticity and the white chromaticity difference; and a step S15 of obtaining a white balance look-up table according to the white balance curve to complete a white balance adjustment of the display device.

In the white balance adjusting method of the display device of this disclosure, not only the minimum error calculation is considered and performed according to the high gray scale white chromaticity and the coordinate system, but also the dark state white chromaticity, which is caused by the rotating angle and the material property of the liquid crystal and cannot be adjusted to be consistent with the bright state white chromaticity, is considered, so that the white chromaticity present in a gray scale changing zone cannot be maintained when approaching the dark gray scale, and the problem of the increased chromaticity error is present. Specifically, measuring each of the gray scales of each of the pixels of the panel to define the white point voltage and the white chromaticity, calculating the white chromaticity difference between the bright state white point voltage and the dark state white point voltage, and defining the target white balance curve according to the white point voltage, the white chromaticity and the white chromaticity difference can obtain the adjusted white balance look-up table for completing the white balance adjustment of the display device. The coordination property of the white balance of the liquid crystal display can be effectively enhanced, the performance representation including the color becomes better, and the picture quality requirements of the optimum chromaticity and brightness are satisfied. More particularly, the coordination continuity at the lower gray scale is better, so that the white balance effect of the display device becomes better.

Optionally in this embodiment, the pixels include a red pixel, a green pixel and a blue pixel. In this specific embodiment, before the white point voltage and the white chromaticity are defined, the three-coordinate-system stimulus values of the red pixel, the green pixel and the blue pixel of the panel corresponding to each gray scale in the standard chromaticity system are measured.

Optionally in this embodiment, the method further includes a step of calculating the stimulus value to 10 to 12 bits by way of interpolation before the step S12 of defining the white point voltage and the white chromaticity.

Optionally in this embodiment, the white point voltage is the highest voltage corresponding to the highest value of the transmission rate of the display device.

The white chromaticity is the red-pixel white chromaticity point, the green-pixel white chromaticity point and the blue-pixel white chromaticity point corresponding to the display device at the highest voltage. In this embodiment, at least the white point voltage, the white chromaticity and the white chromaticity difference need to be used to define the white balance curve. The white chromaticity represents the red-pixel white chromaticity point, the green-pixel white chromaticity point and the blue-pixel white chromaticity point corresponding to the display device at the highest voltage. The above-mentioned white chromaticity point obtained by way of calculating is advantageous to the subsequent calculations of the white point voltage, the white chromaticity and the white chromaticity difference.

Optionally in this embodiment, the step S14 of defining the target white balance curve according to the white point voltage, the white chromaticity and the white chromaticity difference includes: defining a target white balance curve after setting a chromaticity coordinate turning point according to the white point voltage, the white chromaticity and the white chromaticity difference. In this embodiment, the target white balance curve is calculated according to the white point voltage, the white chromaticity and the white chromaticity difference. Thus, the chromaticity coordinate turning point will be set to describe the more suitable target white balance curve upon depicting. Specifically, the adjustment of the chromaticity coordinate turning point is the dynamic adjustment process. When the white chromaticity difference is smaller, the chromaticity coordinate turning point can be reduced to enhance the white balance effect of the display device. When the white chromaticity difference is too large, the chromaticity coordinate turning point is increased to prevent the problem of the too high brightness and chromaticity error. Thus, the depicting requirements of the chromaticity and brightness of the white balance can be better satisfied. In addition, when the white balance of the display device is being adjusted, the white balance curve starts to turn to the dark state white chromaticity at the location, where the gray scale of the bright state white chromaticity error reaches the minimum, according to the chromaticity minimum error method, and the point is the chromaticity coordinate turning point.

Optionally in this embodiment, the method further includes, after the step S14 of defining the target white balance curve according to the white point voltage, the white chromaticity and the white chromaticity difference, the step of: using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2. In this embodiment, the white balance adjustment of the panel is performed by considering the problems of the dark state white chromaticity and the bright state white chromaticity. In order to solve this problem, the white point voltage, the white chromaticity, the white chromaticity difference and the associated data are calculated. Then, the white balance pixel look-up table obtained using the root-mean-square minimum error method can solve the problem of the poor coordination continuity at the lower gray scale. Meanwhile, the chromaticity error problem is solved.

Optionally in this embodiment, keeping the white chromaticity gamma value to be equal to 2.2 must satisfies the following formulas:

$$Y(R-LUT)+Y(G-LUT)+Y(B-LUT)=\text{gamma}2.2 \qquad 1); \text{ and}$$

$$\text{Min}((Wx-\text{Wxtar})^2+(Wy-\text{Wytar})^2) \qquad 2);$$

where Y represents the Y coordinate system of the standard white chromaticity system, R represents the gray scale value of the red pixel at different gray scale voltages, G represents the gray scale value of the green pixel at different gray scale voltages, B represents the gray scale value of the blue pixel at different gray scale voltages, and LUT represents the gray scale value corresponding to each color at different gray scale voltages before adjustment; Wx represents the coordinate value of the white chromaticity X coordinate system, Wy represents the coordinate value of the white brightness Y coordinate system, Wxtar represents the coordinate value of the target white chromaticity X coordinate system, and Wytar represents the coordinate value of the target white chromaticity Y coordinate system. In this embodiment, the formula calculations of the optimum restricting condition based on the target white balance curve are performed to obtain the white balance look-up table satisfying the requirement of this disclosure, and to solve the problems that the low gray scale white chromaticity cannot be maintained, and the chromaticity error is increased.

Optionally in this embodiment, the pixels comprise a red pixel, a green pixel and a blue pixel. The method further includes a step of calculating the stimulus value to 10 to 12 bits by way of interpolation before the step of defining the white point voltage and the white chromaticity. The white point voltage is the highest voltage corresponding to the highest value of the transmission rate of the display device. The white chromaticity is the red-pixel white chromaticity point, the green-pixel white chromaticity point and the blue-pixel white chromaticity point corresponding to the display device at the highest voltage.

Optionally in this embodiment, the pixels comprise a red pixel, a green pixel and a blue pixel. The step of defining the target white balance curve according to the white point voltage, the white chromaticity and the white chromaticity difference includes: defining a target white balance curve after setting a chromaticity coordinate turning point according to the white point voltage, the white chromaticity and the white chromaticity difference;

The method further includes, after the step of defining the target white balance curve according to the white point voltage, the white chromaticity and the white chromaticity difference, the step of: using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2; and Keeping the white chromaticity gamma value to be equal to 2.2 must satisfies the following formulas:

$$Y(R-LUT)+Y(G-LUT)+Y(B-LUT)=\text{gamma}2.2 \quad 1); \text{ and}$$

$$\text{Min}((Wx-\text{Wxtar})^2+(Wy-\text{Wytar})^2) \quad 2);$$

where Y represents the Y coordinate system of the standard white chromaticity system, R represents the gray scale value of the red pixel at different gray scale voltages, G represents the gray scale value of the green pixel at different gray scale voltages, B represents the gray scale value of the blue pixel at different gray scale voltages, and LUT represents the gray scale value corresponding to each color at different gray scale voltages before adjustment; Wx represents the coordinate value of the white chromaticity X coordinate system, Wy represents the coordinate value of the white brightness Y coordinate system, Wxtar represents the coordinate value of the target white chromaticity X coordinate system, and Wytar represents the coordinate value of the target white chromaticity Y coordinate system. In this embodiment, the formula calculations of the optimum restricting condition based on the target white balance curve are performed to obtain the white balance look-up table satisfying the requirement of this disclosure, and to solve the problems that the low gray scale white chromaticity cannot be maintained, and the chromaticity error is increased.

Figure 8:
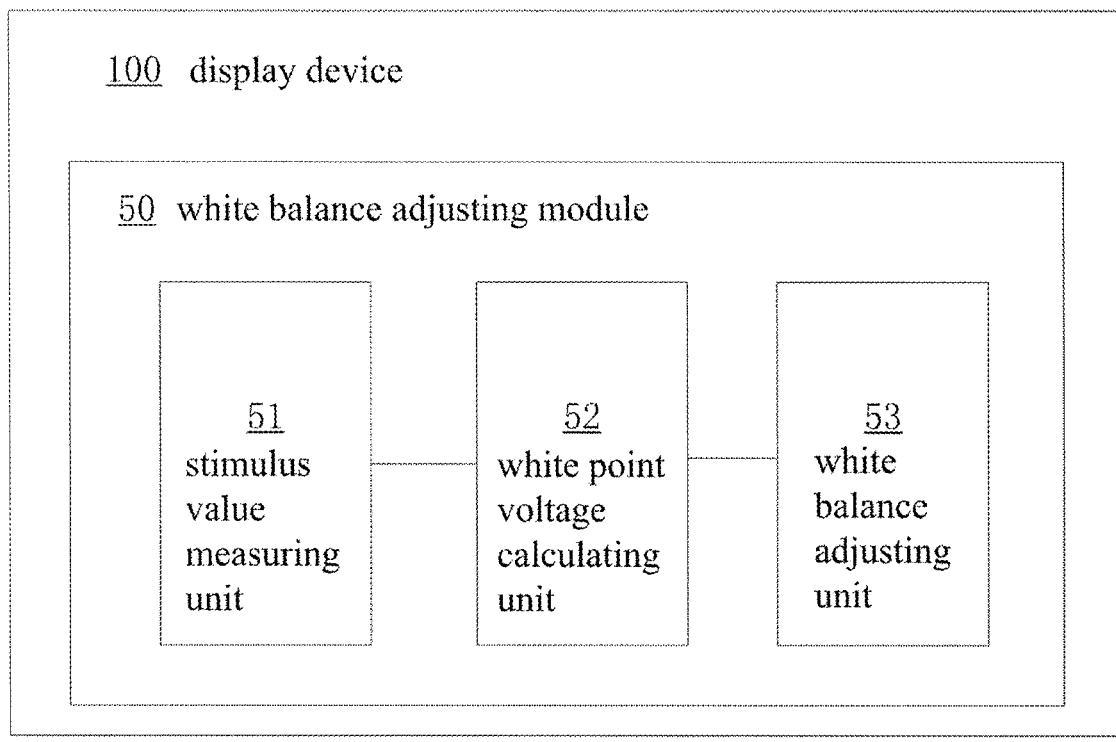
FIG. 8 is a schematic view showing a display device of this disclosure.

FIG. 8 is a schematic view showing a display device of this disclosure.

Referring to FIG. 8 in conjunction with FIGS. 1 to 7, it is obtained that this disclosure further discloses a display device 100 including a white balance adjusting module 50, which includes: a stimulus value measuring unit 51 for measuring a stimulus value of each of gray scales of each of pixels of a panel; a white point voltage calculating unit 52 for defining a white point voltage and a white chromaticity, and calculating a white chromaticity difference between a bright state white point voltage and a dark state white point voltage; and a white balance adjusting unit 53 for defining a target white balance curve according to the white point voltage, the white chromaticity and the white chromaticity difference and obtaining a white balance look-up table according to a white balance curve to complete a white balance adjustment of the display device. The panel of the disclosure can be a Twisted Nematic panel (TN panel), an In-Plane Switching panel (IPS panel), a Vertical Alignment panel (VA panel), a Multi-domain Vertical Alignment panel (MVA panel), and any other suitable panels.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A white balance adjusting method of a display device, comprising:
    measuring a stimulus value of each of gray scales of each of pixels of a panel;
    defining a white point voltage and a white chromaticity;
    calculating a white chromaticity difference between a bright state white point voltage and a dark state white point voltage;
    defining a target white balance curve according to the white point voltage, the white chromaticity and the white chromaticity difference; and
    obtaining a white balance look-up table according to the white balance curve to complete a white balance adjustment of the display device.

2. The white balance adjusting method according to claim 1, wherein the pixels comprise a red pixel, a green pixel, and a blue pixel.

3. The white balance adjusting method according to claim 2, before the step of defining the white point voltage and the white chromaticity, further comprising:
    calculating the stimulus value to 10 to 12 bits by way of interpolation.

4. The white balance adjusting method according to claim 3, wherein the white point voltage is a highest voltage corresponding to a highest value of a transmission rate of the display device; and
    the white chromaticity is a red-pixel white chromaticity point, a green-pixel white chromaticity point, and a blue-pixel white chromaticity point corresponding to the display device at the highest voltage.

5. The white balance adjusting method according to claim 2, wherein the step of defining the target white balance curve according to the white point voltage, the white chromaticity, and the white chromaticity difference comprises:
    defining the target white balance curve after setting a chromaticity coordinate turning point according to the white point voltage, the white chromaticity, and the white chromaticity difference.

6. The white balance adjusting method according to claim 5, after the step of defining the target white balance curve according to the white point voltage, the white chromaticity, and the white chromaticity difference, further comprising:
  using a root-mean-square minimum error method to calculate to obtain red pixel, green pixel, and blue pixel look-up tables of each of the gray scales corresponding to an adjusted white to serve as an adjusted second white balance pixel look-up table to keep a white brightness gamma value to be equal to 2.2.

7. The white balance adjusting method according to claim 6, wherein keeping the white chromaticity gamma value to be equal to 2.2 satisfies formulas of:

$$Y(R-LUT)+Y(G-LUT)+Y(B-LUT)=\text{gamma}2.2 \qquad 1); \text{ and}$$

$$\text{Min}((Wx-\text{Wxtar})^2+(Wy-\text{Wytar})^2) \qquad 2);$$

where Y represents the Y coordinate system of the standard white chromaticity system, R represents the gray scale value of the red pixel at different gray scale voltages, G represents the gray scale value of the green pixel at different gray scale voltages, B represents the gray scale value of the blue pixel at different gray scale voltages, and LUT represents the gray scale value corresponding to each color at different gray scale voltages before adjustment; Wx represents the coordinate value of the white chromaticity X coordinate system, Wy represents the coordinate value of the white brightness Y coordinate system, Wxtar represents the coordinate value of the target white chromaticity X coordinate system, and Wytar represents the coordinate value of the target white chromaticity Y coordinate system.

8. The white balance adjusting method according to claim 1, wherein the pixels comprise a red pixel, a green pixel and a blue pixel;
  the white balance adjusting method, before the step of defining the white point voltage and the white chromaticity, further comprises: calculating the stimulus value to 10 to 12 bits by way of interpolation; the white point voltage is a highest voltage corresponding to a highest value of a transmission rate of the display device; and
  the white chromaticity is a red-pixel white chromaticity point, a green-pixel white chromaticity point, and a blue-pixel white chromaticity point corresponding to the display device at the highest voltage.

9. The white balance adjusting method according to claim 1, wherein the pixels comprise a red pixel, a green pixel, and a blue pixel;
  the step of defining the target white balance curve according to the white point voltage, the white chromaticity and the white chromaticity difference comprises: defining a target white balance curve after setting a chromaticity coordinate turning point according to the white point voltage, the white chromaticity, and the white chromaticity difference;
  the white balance adjusting method, after the step of defining the target white balance curve according to the white point voltage, the white chromaticity and the white chromaticity difference, further comprises: using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2; and keeping the white chromaticity gamma value to be equal to 2.2 satisfies formulas of:

$$Y(R-LUT)+Y(G-LUT)+Y(B-LUT)=\text{gamma}2.2 \qquad 1); \text{ and}$$

$$\text{Min}((Wx-\text{Wxtar})^2+(Wy-\text{Wytar})^2) \qquad 2);$$

where Y represents the Y coordinate system of the standard white chromaticity system, R represents the gray scale value of the red pixel at different gray scale voltages, G represents the gray scale value of the green pixel at different gray scale voltages, B represents the gray scale value of the blue pixel at different gray scale voltages, and LUT represents the gray scale value corresponding to each color at different gray scale voltages before adjustment; Wx represents the coordinate value of the white chromaticity X coordinate system, Wy represents the coordinate value of the white brightness Y coordinate system, Wxtar represents the coordinate value of the target white chromaticity X coordinate system, and Wytar represents the coordinate value of the target white chromaticity Y coordinate system.

10. A white balance adjusting method of a display device, comprising:
  measuring a stimulus value of each of gray scales of each of pixels of a panel, wherein the pixels comprise a red pixel, a green pixel and a blue pixel;
  calculating the stimulus value to 10 to 12 bits by way of interpolation;
  defining a white point voltage and a white chromaticity;
  calculating a white chromaticity difference between a bright state white point voltage and a dark state white point voltage;
  defining the target white balance curve after setting a chromaticity coordinate turning point according to the white point voltage, the white chromaticity and the white chromaticity difference;
  using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2; and
  completing a white balance adjustment of the display device according to the adjusted second white balance pixel look-up table.

11. The white balance adjusting method according to claim 10, wherein the white point voltage is a highest voltage corresponding to a highest value of a transmission rate of the display device; and
  the white chromaticity is a red-pixel white chromaticity point, a green-pixel white chromaticity point, and a blue-pixel white chromaticity point corresponding to the display device at the highest voltage.

12. The white balance adjusting method according to claim 10, wherein keeping the white chromaticity gamma value to be equal to 2.2 satisfies formulas of:

$$Y(R-LUT)+Y(G-LUT)+Y(B-LUT)=\text{gamma}2.2 \qquad 1); \text{ and}$$

$$\text{Min}((Wx-\text{Wxtar})^2+(Wy-\text{Wytar})^2) \qquad 2);$$

where Y represents the Y coordinate system of the standard white chromaticity system, R represents the gray scale value of the red pixel at different gray scale voltages, G represents the gray scale value of the green pixel at different gray scale voltages, B represents the gray scale value of the blue pixel at different gray scale voltages, and LUT represents the gray scale value corresponding to each color at different gray scale voltages before adjustment; Wx represents the coordinate value of the white chromaticity X coordinate system, Wy represents the coordinate value of the white brightness Y coordinate system, Wxtar represents the coordinate value of the target white chromaticity X coordinate system, and Wytar represents the coordinate value of the target white chromaticity Y coordinate system.

13. A display device, comprising:
a white balance adjusting module, comprising:
a stimulus value measuring unit measuring a stimulus value of each of gray scales of each of pixels of a panel;
a white point voltage calculating unit defining a white point voltage and a white chromaticity, and calculating a white chromaticity difference between a bright state white point voltage and a dark state white point voltage; and
a white balance adjusting unit defining a target white balance curve according to the white point voltage, the white chromaticity and the white chromaticity difference, and obtaining a white balance look-up table according to a white balance curve to complete a white balance adjustment of the display device.

14. The display device according to claim 13, wherein the pixels comprise a red pixel, a green pixel and a blue pixel.

15. The display device according to claim 14, wherein the white balance adjusting unit defines the target white balance curve after setting a chromaticity coordinate turning point according to the white point voltage, the white chromaticity and the white chromaticity difference.

16. The display device according to claim 14, wherein the white balance adjusting unit uses a root-mean-square minimum error method to calculate to obtain red pixel, green pixel, and blue pixel look-up tables of each of the gray scales corresponding to an adjusted white to serve as an adjusted second white balance pixel look-up table to keep a white brightness gamma value to be equal to 2.2.

17. The display device according to claim 16, wherein keeping the white chromaticity gamma value to be equal to 2.2 satisfies formulas of:

$$Y(R-LUT)+Y(G-LUT)+Y(B-LUT)=\text{gamma}2.2 \quad \quad 1); \text{ and}$$

$$\text{Min}((Wx-\text{Wxtar})^2+(Wy-\text{Wytar})^2) \quad \quad 2);$$

where Y represents the Y coordinate system of the standard white chromaticity system, R represents the gray scale value of the red pixel at different gray scale voltages, G represents the gray scale value of the green pixel at different gray scale voltages, B represents the gray scale value of the blue pixel at different gray scale voltages, and LUT represents the gray scale value corresponding to each color at different gray scale voltages before adjustment; Wx represents the coordinate value of the white chromaticity X coordinate system, Wy represents the coordinate value of the white brightness Y coordinate system, Wxtar represents the coordinate value of the target white chromaticity X coordinate system, and Wytar represents the coordinate value of the target white chromaticity Y coordinate system.

18. The display device according to claim 13, wherein the white balance adjusting module calculates the stimulus value to 10 to 12 bits by way of interpolation.

19. The display device according to claim 18, wherein the white point voltage is a highest voltage corresponding to a highest value of a transmission rate of the display device; and
the white chromaticity is a red-pixel white chromaticity point, a green-pixel white chromaticity point, and a blue-pixel white chromaticity point corresponding to the display device at the highest voltage.

* * * * *